W. M. MUCHOW.
DENTAL FLOSS HOLDER.
APPLICATION FILED MAR. 29, 1916.
1,219,986.
Patented Mar. 20, 1917.
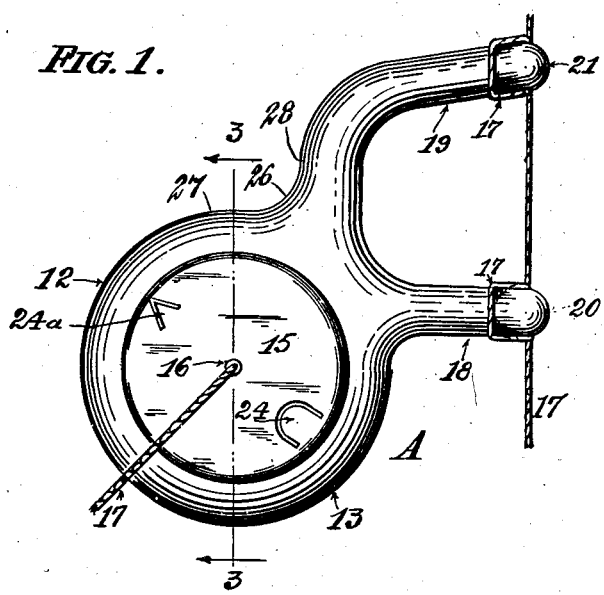
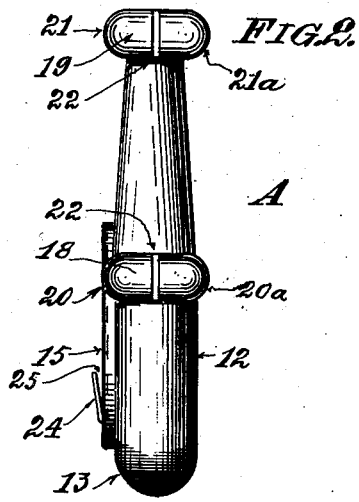
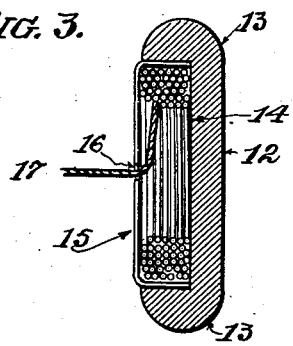
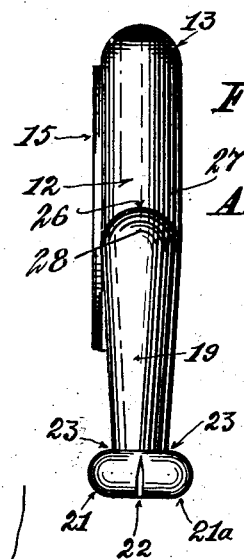
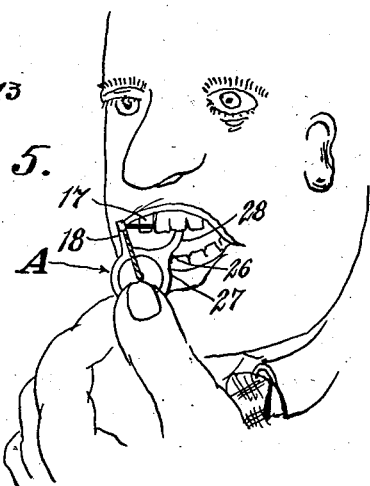
INVENTOR:
Wm. M. Muchow,
BY
ATTORNEYS.

UNITED STATES PATENT OFFICE.

WILLIAM MARK MUCHOW, OF EVANSTON, ILLINOIS.

DENTAL-FLOSS HOLDER.

1,219,986.   Specification of Letters Patent.   Patented Mar. 20, 1917.

Application filed March 29, 1916. Serial No. 87,521.

*To all whom it may concern:*

Be it known that I, WILLIAM MARK MUCHOW, a citizen of the United States, and a resident of the city of Evanston, in the county of Cook and State of Illinois, have invented a certain new and useful Improvement in Dental-Floss Holders; and I do hereby declare that the following description of my said invention, taken in connection with the accompanying sheet of drawings, forms a full, clear, and exact specification, which will enable others skilled in the art to which it appertains to make and use the same.

My invention relates generally to improvements in dental floss holders; and it consists, essentially, in the novel and peculiar combination of parts and details of construction, as hereinafter first fully set forth and described and then pointed out in the claims.

This invention has general reference to dental floss holders, and its object is the production of an efficient, serviceable, and highly sanitary instrument for cleaning the teeth of human beings. To accomplish these results, I construct this instrument as shown in the drawings already mentioned, which drawings serve to illustrate this invention more fully, and form a part of this specification, and in which Figure 1 is a plan of my improved dental floss holder. Fig. 2 is an end view of the same. Fig. 3 is a sectional view on line 3—3 of Fig. 1, taken in the direction of the arrows shown. Fig. 4 is a view similar to Fig. 2, the device having been rotated through an angle of 45 degrees, all of the foregoing figures being considerably magnified to better illustrate the details of construction of this instrument. Fig. 5 is a view illustrative of the application of my said invention.

Like parts are designated by the same characters and symbols of reference in all the figures.

It is a well-known fact, and dentists of repute agree, that if the contacting points of the teeth are kept clean, the or areas of the teeth will be almost, if not entirely prevented. It is also a well-known fact that more than 75% of all tooth-cavities occur between the teeth where the application of a tooth brush is ineffective, or which space cannot be reached by a tooth brush.

It has become customary to use dental floss by applying hand pressure to force the strand past the contacting points of the teeth for the purpose of cleaning and subsequent cavity-prevention. To force the strand between two teeth in close contact requires great force and a steady hand to prevent the strand from suddenly and violently snapping past the contacting point onto the gums, thereby causing pain, bleeding, and inflammation.

Numerous instruments have also been constructed to pass a tautly stretched strand between adjacent teeth, which may be more or less successfully employed, but which are not as simple in construction, not as sanitary, nor as efficient as my present device. One essential feature of my device resides in the fact that this device is so constructed that the lower jaw of a person is used to force the strand between the teeth by simply biting the floss holder, as indicated in Fig. 5. It is possible to exert an upward force of more than 200 lbs. with the lower jaw, and owing to the trained feeling in pressure which a person acquires while daily masticating food, the jaw becomes a perfect guide in performing and controlling, and safely inserting, the floss.

In the drawings, A designates the floss holder as a whole. It is, in the preferred embodiment of my invention, a flat body 12, of circular outline the margin 13 of which is preferably semi-circular in contour. In this body I provide a, preferably circular, cavity 14, serving as a receptacle for the dental floss 17; and this cavity is closed by a removable cover 15, there being in said cover an opening 16, through which the strand 17 may be passed.

From the margin of the body 12 there projects laterally approximately, or radially, an arm 18, and in spaced relation to this arm 18, there is a further arm 19, which latter arm is a substantially right-angled member also emanating, but substantially tangentially, from said body 12. This latter arm 19 forms at its jointure with the said circular body A, a sharply, well defined, approximately right angled shoulder 26, whereby the portion 27 of the said circular body serves as a stop to prevent the instrument from being passed too far into the mouth, while the portion 28 of the arm 19 performs the function of a rest upon the teeth of the person using this instrument, and to permit the jaw of such person to force the strand into the interstices between the teeth.

The two arms terminate, each, in two lobe-like projections, 20, 20ª, and 21, 21ª, as best observed in Fig. 4; and medially of these lobes there is in each arm a restricted, tapering, slot 22, for the reception and retention of the strand 17, as will hereinafter more fully appear.

The lobes 20, 20ª, and 21, 21ª, terminate sharply at their junction with the terminals of said arms, as indicated in Fig. 4, so as to securely hold the strand to the arms behind these lobes, and prevent the strand from leaving the arms when the strand between the arms is drawn taut and applied between the teeth. The slots 22 are made tapering so as to impinge upon the strand, or in other words, to cause the strand to be wedged in the slots and thereby assisting in the retention of the tightly-stretched strand, 17.

In the cover 15, provision is made whereby a predetermined length of the strand may be readily severed or cut. This means I prefer to produce in the cover by forming thereon a sharp lip or projection 24, raised slightly above the plane of the cover so that the floss may be easily passed in the space 25, Fig. 2, underneath said lip, which lip, standing at an acute angle to the plane of the cover, will impinge upon, and hold the strand so that by pulling on the free end of the strand severance of the strand at the lip will be effected. I do not wish to confine myself to any particular contour of said lip or tongue, and in Fig. 1, I have illustrated two forms of such lips, all of which are very effective in their function.

I prefer, for sanitary reasons, to produce the body of this device integrally with the two arms, and to make the same from a somewhat resilient, non-metallic, and tasteless material, hard rubber, celluloid, and analogous materials, being suitable for the purpose. The cover 15, I prefer to make from aluminum or other metal which is non-oxidizing under atmospheric conditions; but it is evident that it can also be readily produced from other substances or materials.

To apply the strand, or thread to this device after a proper length has been removed from the container, I prefer to proceed as follows:

First pass the end of the thread through the slot in one of the arms, then to the right or to the left around one of the lobes then again into said slot and around the opposing lobe and back through said slot, so that the fastening resembles the figure 8. The thread is then carried to the next arm and the winding of the thread repeated, after which the instrument is ready for application in the manner illustrated in Fig. 5. In this figure the instrument is shown applied to the upper teeth; but is is obvious that to clean the lower teeth, the instrument is reversed, the arm 18 resting on the upper teeth, and the lower jaw moved upwardly to pass the strand between adjacent teeth.

The thread employed in this device is preferably in the form of a coil which unwinds from the center of the coil, as shown in Fig. 3, and it is thereby enabled to retain its coiled formation until the entire length has been withdrawn from the receptacle.

I have shown the thread in the drawings as issuing from its receptacle through an opening in the cover; but it is evident that an opening for the passage of the thread may be otherwise located without departing from my invention.

I have hereinbefore disclosed the preferred mode of practising my invention, but I reserve the right to make such and any changes as might occur to one skilled in the art to which this invention appertains, or to make any and all such alterations as may be permitted under the doctrine of equivalents.

Having thus fully described my invention I claim as new, and desire to secure to myself by Letters Patent of the United States:—

1. An article of the class described, including a non-metallic, slightly elastic, circular body having flat sides, an integral arm extending substantially tangentially from the circular marginal edge of said body, said arm having a well-defined shoulder at its jointure with said body, said arm terminating in an angularly disposed projection, said arm being constructed to form a bite for the teeth, and the periphery of said circular body being constructed to form a stop at its junction with said arm limiting the degree of insertion of said arm into the mouth, a second integral arm extending approximately radially from said circular body and in substantial parallelism to said projection, the ends of said projection and said arm having alined wedge-slots constructed for the wedging therein of a strand of dental floss or the like, the whole being formed integrally from a non-metallic material which cannot injure the teeth when contacting therewith.

2. An article of the class described, including a circular body member having flat sides, an integral arm extending substantially tangentially from the circular margin of said body member, said arm terminating in an angular projection, said arm being constructed to form a bite for the teeth, and the periphery of said body being adapted to form at the jointure of said arm and said body a stop limiting the degree of insertion of said body into the mouth, a second integral arm extending approximately radially from said body in substantial parallelism to said projection, the ends of said projection and said arm having alined wedge-slots constructed for the wedging therein of a strand of dental floss, and lobes extending laterally of the ends of said projection and said arm and constructed for the wrapping therearound the free ends of said strand of dental floss, the whole being formed integrally from a non-metallic, slightly elastic, material which will not injure the teeth when contacting therewith.

3. As a new article of manufacture, an integrally formed circular body having flat sides, there being formed on the circular margin of said flat body a projection constructed to afford a bite for the teeth, the periphery of said body being constructed to form a stop to limit the depth of insertion of said body into the mouth, an integrally formed arm extending from said body in spaced apart relationship, there being alined notches in said arm, and said projection, constructed for the wedging therein of a strand of thread, the whole being formed integrally from a non-metallic, slightly elastic, material which will not injure the teeth when contacting therewith.

4. A dental floss holder, comprising a main body, there being in said main body a cavity constructed to contain a coil of thread, said body being of substantially circular contour, an arm approximately radially projecting from said main body, a further arm projecting substantially tangentially from said main body, said latter arm having a bent portion substantially parallel to said first mentioned arm, lobes laterally projecting from the extremities of said arms, there being at the extremity of each arm a constricted slot, the slots being in axial alinement, a cover for said cavity, there being in said cover an exit opening, said cover having a cutter adapted for severance of said floss, said main body and said arms being integrally formed.

In testimony that I claim the foregoing as my invention, I have hereunto set my hand.

WILLIAM MARK MUCHOW.